(12) United States Patent
Marin

(10) Patent No.: US 11,220,920 B2
(45) Date of Patent: Jan. 11, 2022

(54) TURBINE ENGINE ROTOR LOCK

(71) Applicant: SAFRAN AIRCRAFT ENGINES, Paris (FR)

(72) Inventor: Sebastien Marin, Rochester, NH (US)

(73) Assignee: SAFRAN AIRCRAFT ENGINES, Paris (FR)

( * ) Notice: Subject to any disclaimer, the term of this patent is extended or adjusted under 35 U.S.C. 154(b) by 573 days.

(21) Appl. No.: 15/302,902

(22) PCT Filed: Apr. 2, 2015

(86) PCT No.: PCT/FR2015/050862
§ 371 (c)(1),
(2) Date: Oct. 7, 2016

(87) PCT Pub. No.: WO2015/155446
PCT Pub. Date: Oct. 15, 2015

(65) Prior Publication Data
US 2017/0037738 A1   Feb. 9, 2017

Related U.S. Application Data

(60) Provisional application No. 61/976,254, filed on Apr. 7, 2014.

(51) Int. Cl.
*F01D 5/32* (2006.01)
*F01D 5/30* (2006.01)
*F04D 29/32* (2006.01)

(52) U.S. Cl.
CPC .......... *F01D 5/326* (2013.01); *F01D 5/3007* (2013.01); *F04D 29/322* (2013.01); *F05D 2220/36* (2013.01); *F05D 2300/6012* (2013.01); *Y02T 50/60* (2013.01)

(58) Field of Classification Search
CPC . F01D 5/32; F01D 5/323; F01D 5/326; F01D 5/3007; F01D 5/3015; F05D 2300/6012
See application file for complete search history.

(56) References Cited

U.S. PATENT DOCUMENTS

| | | | | |
|---|---|---|---|---|
| 5,259,728 A * | 11/1993 | Szpunar | ................ | F01D 5/3007 416/2 |
| 5,282,720 A * | 2/1994 | Szpunar | .................. | F01D 5/323 416/220 R |
| 6,910,866 B2 * | 6/2005 | Bassot | .................. | F01D 5/3007 416/220 R |

(Continued)

FOREIGN PATENT DOCUMENTS

| | | |
|---|---|---|
| EP | 1 748 154 A2 | 1/2007 |
| WO | 2012/150425 A1 | 11/2012 |

OTHER PUBLICATIONS

International Search Report dated Jul. 18, 2015 in PCT/FR2015/050862 Filed Apr. 2, 2015.

*Primary Examiner* — Brian P Wolcott
(74) *Attorney, Agent, or Firm* — Oblon, McClelland, Maier & Neustadt, L.L.P.

(57) ABSTRACT

A turbine engine rotor lock, in particular for a turbojet fan, adapted to retain a blade axially relative to a disk of the rotor, the lock including a composite body including a woven fiber structure embedded in a matrix; and a damper pad made of elastomer and fastened to the composite body.

5 Claims, 1 Drawing Sheet

(56) References Cited

U.S. PATENT DOCUMENTS

| | | | |
|---|---|---|---|
| 7,686,585 B2 * | 3/2010 | Buisson | F01D 5/326 |
| | | | 416/193 A |
| 9,745,995 B2 * | 8/2017 | Jevons | F01D 5/3007 |
| 9,803,648 B2 * | 10/2017 | Care | F01D 5/3015 |
| 2009/0226321 A1 | 9/2009 | Buisson et al. | |
| 2013/0156591 A1 | 6/2013 | Alexander | |
| 2014/0072437 A1 * | 3/2014 | Marlin | F01D 5/323 |
| | | | 416/220 R |

\* cited by examiner

TURBINE ENGINE ROTOR LOCK

TECHNICAL FIELD

The present description relates to a turbine engine rotor lock. In particular, it may be a lock for a turbojet fan.

Such a lock serves to retain a blade axially relative to the rotor disk on which the blade is mounted.

BACKGROUND

In the present description, the axial direction corresponds to the direction of the axis of rotation of the turbine engine rotor, and a radial direction is a direction perpendicular to that axis. Likewise, an axial plane is a plane containing the axis of rotation of the rotor, and a radial plane is a plane perpendicular to that axis. A circumferential or tangential direction, at a point remote from the axis, corresponds to a direction perpendicular to the axial and radial directions.

Furthermore, unless specified to the contrary, the adjectives "inner" and "outer" are used with reference to a radial direction, such that the inner portion (i.e. radially inner portion) of an element is closer to the axis of rotation that is the outer portion (i.e. the radially outer portion) of the same element.

Finally, "upstream" and "downstream" are defined relative to the normal flow direction of the fluid passing through the turbine engine (from upstream to downstream).

Conventionally, in a turbofan, the fan rotor has blades arranged around a central portion of the rotor that is known as a "disk". Each blade has a root engaged in a groove, referred to as a "slot", that is formed in the periphery of the disk. The profile (in cross-section) of a slot is shaped so as to retain a blade root radially, i.e. so as to prevent the blade root from escaping from the slot in the radial direction under the effect of centrifugal force. On assembly, each blade root is engaged in its slot by causing it to slide through one end of the slot, e.g. its upstream end.

It is known to "close" each slot at this end by means of a lock. For example, the lock is engaged in side notches formed on either side of the slot (i.e. in the side walls of the slot), at the end of the slot.

The lock plays an important role since it serves to stop the blade moving in translation in the axial direction, it being specified that in operation the blade exerts a force on the lock that often lies in the range 5000 Newtons (N) to 9000 N. In addition, the lock performs a shock absorber function (e.g. in the event of ingesting a bird or losing a blade) by means of a damper pad interposed between the body of the lock and the root of the blade.

Examples of locks are described in patent Documents FR 2 889 264 and FR 2 974 864.

A lock is also known that comprises a metal body made of titanium alloy having an aluminum damper pad fastened thereto, the pad presenting a honeycomb structure. A steel plate is also fastened to the surface of the damper pad in order to spread the load over all of the cells in the honeycomb structure. Although technically satisfactory, that metal lock presents the drawback of being relatively complex to fabricate. Also, that metal lock is relatively heavy, which is problematic in the field of aviation, where reducing the weight of parts is a constant concern.

There therefore exists a need for a novel type of lock.

GENERAL PRESENTATION

The present description relates to a turbine engine rotor lock, in particular for a turbojet fan, and suitable for retaining a blade axially relative to a disk of the rotor.

In an embodiment, the lock comprises a composite body comprising a woven fiber structure embedded in a matrix. The lock may also comprise a damper pad made of elastomer, that is fastened to the composite body. Such materials make it possible to reduce the weight of the lock significantly in comparison with known locks, while also making it possible to obtain the mechanical strength needed for the intended use.

In particular, in terms of weight saving, and with reference only to the body of the lock and by way of example, it is possible to go from 55 grams (g) per part (for a metal body) to 20 g per part (for a composite body).

In terms of the mechanical strength of the lock, this can be improved by orienting the yarns of the fiber structure in the radial and tangential directions of the rotor. Thus, in certain embodiments, the woven fiber structure comprises warp yarns and weft yarns oriented in such a manner that when the lock is in position on the rotor, the warp yarns are oriented in the tangential direction of the rotor and the weft yarns are oriented in the radial direction of the rotor, or vice versa.

The fiber structure may be made by three-dimensional weaving. In comparison with other methods, and in particular with using layers of fabric preimpregnated with a resin ("prepregs"), three-dimensional weaving makes it possible to obtain a unit that is stronger and less subject to the risk of delamination.

In certain embodiments, a portion of the fiber structure, situated opposite the damper pad, forms a tab projecting away from the damper pad. In particular, when the fiber structure is made by three-dimensional weaving, said portion may be woven in non-interlinked manner so as to enable it to be folded relative to the remainder of the structure.

In addition to the characteristics mentioned above, the proposed device may present one or more of the following characteristics, considered in isolation or in technically feasible combinations:

The matrix of the composite body is organic. For example, the organic matrix may be a polymer resin. In particular, the organic matrix may be made from a thermosetting resin based on epoxy polymer, on polybismaleimide, or on cyanate ester, or from a thermoplastic resin based on polyaryletherketone (PAEK—including including PEEK, PEKK, PEK, PEKEKK, PEKKEK, etc.), on polyethylenimine (PEI), on poly(phenylene sulfide) (PPS), or on polyimide (PI), or resulting from a mixture of the above-specified polymers.

The fiber structure acting as the reinforcing structure may be made of fibers, each fiber being a filament of material or a bundle of filaments (e.g. a twisted strand). In particular, the fibers may be carbon, aramid, glass, etc. fibers.

The damper pad is fastened to the composite body by adhesive.

The above characteristics and advantages, and others, appear on reading the following detailed description of an embodiment of the proposed lock. The detailed description refers to the accompanying drawings.

BRIEF DESCRIPTION OF THE DRAWINGS

The accompanying drawings are diagrammatic, they are not to scale, and they seek above all to illustrate the principles of the invention.

In the drawings, from one figure to another, elements (or portions of an element) that are identical are given the same reference signs.

DETAILED DESCRIPTION OF EMBODIMENT(S)

An embodiment is described in detail below with reference to the accompanying drawings. This embodiment illustrates the characteristics and advantages of the invention. It should nevertheless be recalled that the invention is not limited to this embodiment.

Figure 1:
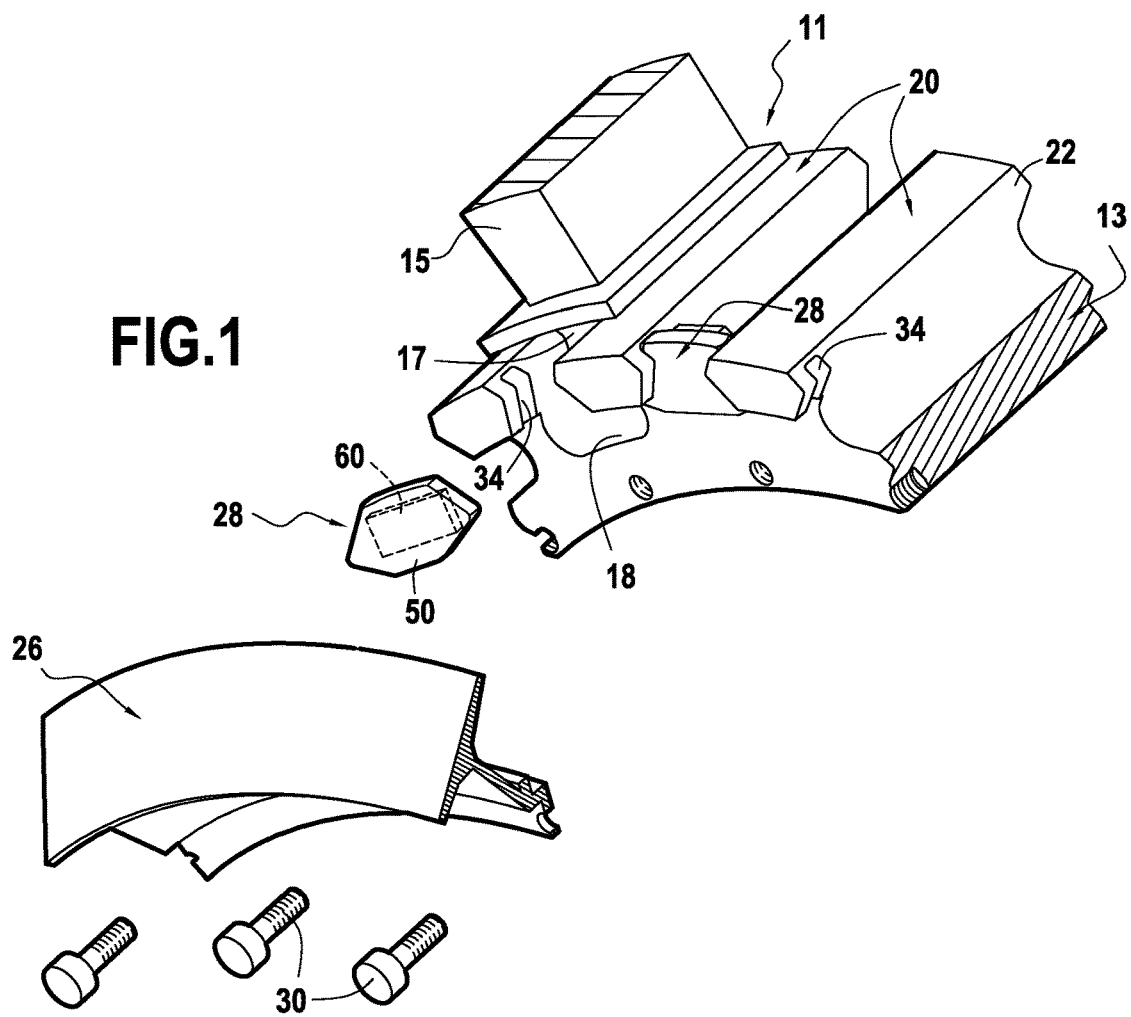
FIG. 1 is a fragmentary, exploded perspective view of an example of a fan rotor.

The fan rotor 11 of FIG. 1 is made up mainly of a disk 13 having fan blades 15 attached thereto. Each blade 15 has a blade root 17 engaged in a corresponding slot or groove 18 in the disk 13.

In this example, the disk 13 has radial splines 20 at its periphery extending over a certain length parallel to the axis of the rotor. Between them, the splines 20 define the slots 18. The profile of the splines 20 is such that two side bulges 22 lie beside the top opening of each slot 18. The shape of the splines 20, and thus of the slot 18, is determined so as to retain the blade roots 17. A longitudinal spacer (not shown) may be interposed between the bottom of the slot 18 and the blade root 17 in order to stabilize the radial position of the blade.

The upstream ends of the slots 18 may be closed, both collectively by an annular end plate 26, and individually by respective locks 28. The annular end plate 26 may be assembled to the disk 13 by means of screws 30.

In this example, each lock 28 is engaged in notches 34 formed on either side of the slot 18 that is closed by the lock 28, in the vicinity of the upstream end of the slot. More precisely, each notch 34 may be formed in the respective splines 20 on either side of the slot 18, close to the upstream ends of the splines. The lock 28 thus opposes axial movement of the blade 15 in the upstream direction.

Figure 2:
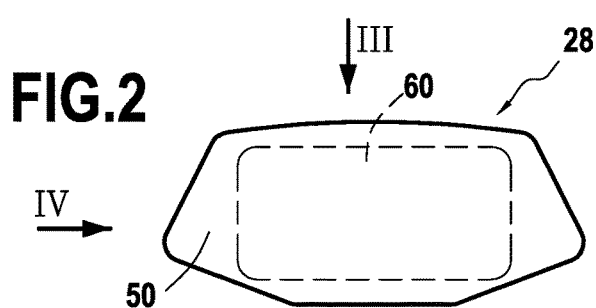
FIG. 2 is a face view of the FIG. 1 lock.
Figure 4:
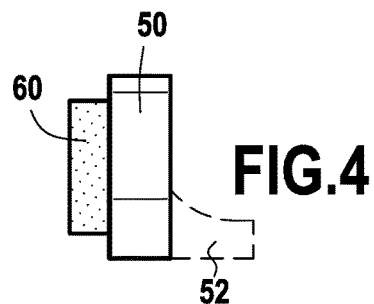
FIG. 4 is a side view of the FIG. 2 lock, seen looking along arrow IV.
Figure 3:
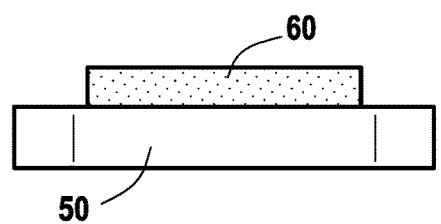
FIG. 3 is a plan view of the FIG. 2 lock, seen looking along arrow III.

With reference to FIGS. 2 to 4, the lock 28 comprises a composite body 50. The body 50 comprises a woven fiber structure embedded in a matrix. For example, the fiber structure is made of intermediate modulus carbon fibers (e.g. "IM7" fibers), and it may be made by three-dimensional weaving. This fiber structure is embedded in an organic resin, for example an epoxy resin (e.g. a "PR520" resin), forming the matrix of the composite body 50.

A damper pad 60 made of elastomer, e.g. of butyl rubber or ethylene propylene diene monomer (EPDM), is fastened on the downstream face of the composite body. For example, the damper pad 60 may be adhesively bonded using a methacrylate adhesive (e.g. an "Araldite 2048" adhesive), after surface treatment.

Optionally, as shown in FIG. 4, a portion of the fiber structure, situated opposite the damper pad, may form a tab 52 that projects away from the damper pad 60.

The embodiment described in the present description is given by way of nonlimiting illustration, and in the light of this description, the person skilled in the art can easily modify this embodiment or can envisage others, while remaining within the scope of the invention.

Furthermore, the term "comprising a" should be understood as being synonymous with "comprising at least one", unless specified to the contrary.

Finally, the various characteristics of the embodiment described in the present description may be considered in isolation or may be combined with one another. When they are combined, these characteristics may be combined as described above or in other ways, the invention not being limited to the specific combinations described above. In particular, unless specified to the contrary or unless there is technical incompatibility, a characteristic described with reference to any one particular embodiment may be applied in analogous manner to another embodiment.

The invention claimed is:

1. A turbine engine rotor comprising:
   a disk;
   blades attached to the disk;
   a lock for the turbine engine rotor, the lock retaining at least one of the blades axially relative to the disk of the turbine engine rotor, the lock including:
   a composite body comprising a woven fiber structure embedded in a matrix, and
   a damper pad made of elastomer and fastened to the composite body,
   wherein the woven fiber structure comprises warp yarns and weft yarns oriented such that when the lock is in position on the turbine engine rotor, the warp yarns are oriented in a tangential direction of the turbine engine rotor and the weft yarns are oriented in a radial direction of the turbine engine rotor, or vice versa,
   wherein each blade is fastened in a slot of the disk by a blade root,
   wherein the lock is fastened to an axial end of the slot for said at least one of the blades, and
   wherein the damper pad is situated between the blade root of said at least one of the blades and the composite body.

2. The turbine engine rotor according to claim 1, wherein the woven fiber structure is made by three-dimensional weaving.

3. The turbine engine rotor according to claim 1, wherein a portion of the woven fiber structure, situated opposite the damper pad, forms a projecting tab oriented away from the damper pad.

4. The turbine engine rotor according to claim 1, wherein the matrix of the composite body is organic.

5. The turbine engine rotor according to claim 1, wherein the damper pad is fastened to the composite body by adhesive bonding.

* * * * *